(12) United States Patent
Ishikawa et al.

(10) Patent No.: US 12,423,084 B2
(45) Date of Patent: Sep. 23, 2025

(54) SERVER, SOFTWARE UPDATE SYSTEM, SOFTWARE UPDATE METHOD, AND NON-TRANSITORY STORAGE MEDIUM

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 18/323,655

(22) Filed: May 25, 2023

(65) Prior Publication Data
US 2024/0069893 A1  Feb. 29, 2024

(30) Foreign Application Priority Data

Aug. 26, 2022 (JP) ................................ 2022-134852

(51) Int. Cl.
*G06F 8/65* (2018.01)
*B60R 16/023* (2006.01)

(52) U.S. Cl.
CPC ............. *G06F 8/65* (2013.01); *B60R 16/023* (2013.01)

(58) Field of Classification Search
USPC ....................................................... 717/168
See application file for complete search history.

(56) References Cited

U.S. PATENT DOCUMENTS

| | | | | |
|---|---|---|---|---|
| 9,772,839 B2* | 9/2017 | Hong | ................ | H04M 1/72406 |
| 9,776,638 B1* | 10/2017 | Green | ..................... | H04W 4/44 |
| 10,257,304 B2* | 4/2019 | Lavi | .................... | H04L 67/5683 |
| 11,347,495 B2* | 5/2022 | Hayashidera | ............. | G06F 8/65 |
| 2009/0300595 A1* | 12/2009 | Moran | ...................... | G06F 8/65 |
| | | | | 717/173 |
| 2018/0081670 A1* | 3/2018 | Caushi | ..................... | G07C 5/00 |
| 2018/0150290 A1* | 5/2018 | Matsuda | ............. | G06F 11/1433 |

FOREIGN PATENT DOCUMENTS

JP  2017-149323 A  8/2017

OTHER PUBLICATIONS

"Software Updates"; Tesla Model 3 Owner's Manual found at the Tesla.com website [full URL included in ref.] as captured by the Wayback Machine Internet Archive (archive.org) on Jun. 28, 2022 (Year: 2022).*

"Tesla Model X Owner's Manual 2021+"; tesla.com website; Software version: 2025.8, North America; Mar. 5, 2025 (Year: 2025).*

* cited by examiner

*Primary Examiner* — Kenneth Tang
*Assistant Examiner* — Clint Thatcher
(74) *Attorney, Agent, or Firm* — Oblon, McClelland, Maier &Neustadt, L.L.P.

(57) ABSTRACT

A server includes one or more processors configured to: make a request of a first terminal and a second terminal for a reply as to whether to approve a process related to update of software for a control device mounted on a vehicle, the first terminal being a terminal mounted on the vehicle, and the second terminal being a terminal to be carried by a user of the vehicle; and when receiving both the reply from the first terminal and the reply from the second terminal as a response to the request, invalidate the reply from the second terminal and validate the reply from the first terminal.

8 Claims, 4 Drawing Sheets

SERVER, SOFTWARE UPDATE SYSTEM, SOFTWARE UPDATE METHOD, AND NON-TRANSITORY STORAGE MEDIUM

CROSS-REFERENCE TO RELATED APPLICATION

This application claims priority to Japanese Patent Application No. 2022-134852 filed on Aug. 26, 2022, incorporated herein by reference in its entirety.

BACKGROUND

1. Technical Field

The present disclosure relates to a server, a software update system, a software update method, and a non-transitory storage medium.

2. Description of Related Art

Japanese Unexamined Patent Application Publication No. 2017-149323 (JP 2017-149323 A) discloses a technique of updating software for a control device mounted on a vehicle using an Over The Air (OTA) technology.

SUMMARY

The server described in JP 2017-149323 A makes a request of a smartphone for a reply as to whether to approve update of software, and executes download of new software (an updated version of the software) when a reply of approval is received from the smartphone. The smartphone corresponds to a terminal (hereinafter also referred to as a "portable terminal") that can be carried by a user of a vehicle.

However, the portable terminal is not always the best Human Machine Interface (HMI) for making the reply. For example, a user on a vehicle is less likely to perform an erroneous operation by operating a terminal (hereinafter also referred to as an "in-vehicle terminal") mounted on the vehicle than by operating a portable terminal when the user performs an operation for the reply while driving the vehicle. The convenience for the user is significantly impaired if a process (e.g. download) related to software update not desired by the user is executed based on the erroneous operation. When the HMI for making the reply is limited to the in-vehicle terminal, on the other hand, the user cannot make the reply using the OTA technology when the vehicle is not on the vehicle. This also incurs a reduction in the convenience for the user.

The present disclosure provides a technique of suppressing execution of a process related to software update not desired by a user due to an erroneous operation while securing sufficient convenience for the user in software update.

A first aspect of the present disclosure provides a server including one or more processors configured to: make a request of a first terminal and a second terminal for a reply as to whether to approve a process related to update of software for a control device mounted on a vehicle; and, when receiving both the reply from the first terminal and the reply from the second terminal as a response to the request, invalidate the reply from the second terminal and validate the reply from the first terminal. The first terminal is a terminal mounted on the vehicle, and the second terminal is a terminal to be carried by a user of the vehicle.

A second aspect of the present disclosure provides a software update system including: a vehicle; a first terminal mounted on the vehicle; a second terminal to be carried by a user of the vehicle; and a server. The server is configured to make a request of the first terminal and the second terminal for a reply as to whether to approve a process related to update of software for a control device mounted on the vehicle. Each of the first terminal and the second terminal is configured to prompt the user to perform an operation that indicates whether to approve or reject the request. Each of the first terminal and the second terminal is configured to send a reply that matches the operation to the server when the operation is performed by the user. The server is configured to when receiving both the reply from the first terminal and the reply from the second terminal, invalidate the reply from the second terminal and validate the reply from the first terminal.

A third aspect of the present disclosure provides a software update method executed by a computer. The software update method includes: making a request of a first terminal and a second terminal for a reply as to whether to approve a process related to update of software for a control device mounted on a vehicle; and invalidating the reply from the second terminal and validating the reply from the first terminal when receiving both the reply from the first terminal and the reply from the second terminal as a response to the request. The first terminal is a terminal mounted on the vehicle, and the second terminal is a terminal to be carried by a user of the vehicle.

A fourth aspect of the present disclosure provides a non-transitory storage medium storing instructions that are executable by a computer and that cause the computer to execute the software update method. A certain embodiment provides a computer device including a storage device that stores the above program and a processor that executes the program stored in the storage device. Another embodiment provides a computer device that distributes the above program.

With the present disclosure, it is possible to suppress execution of a process related to software update not desired by a user due to an erroneous operation while securing sufficient convenience for the user in software update.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail with reference to the drawings. In the drawings, like or corresponding portions are denoted by like signs in order not to repeat description thereof.

Figure 1:
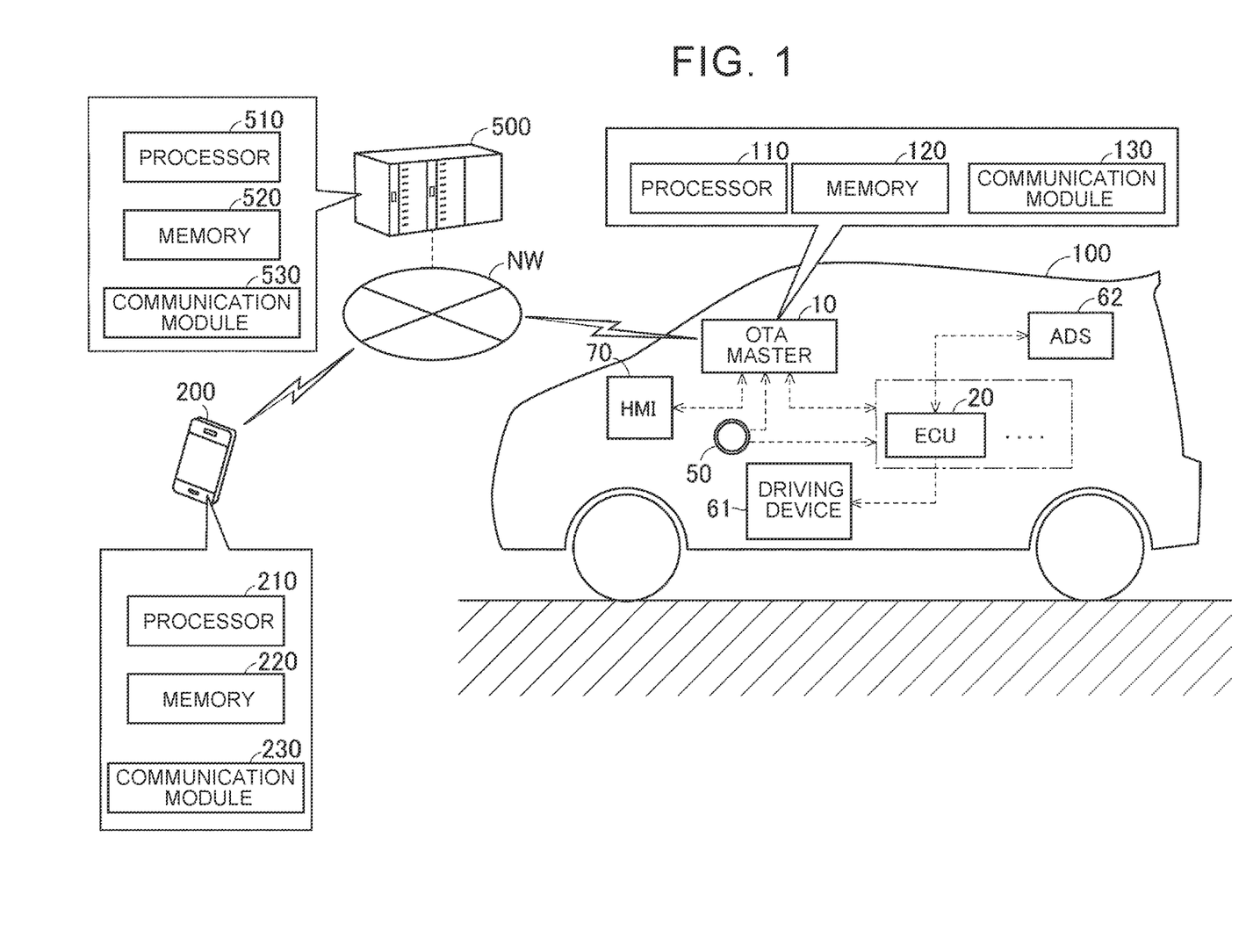
FIG. 1 is a diagram illustrating the configuration of a software update system according to an embodiment of the present disclosure.

FIG. 1 is a diagram illustrating the configuration of a software update system according to the embodiment of the present disclosure. As illustrated in FIG. 1, the software update system includes a vehicle 100, a portable terminal 200, and an Over The Air (OTA) center 500.

The vehicle 100 is a battery electric vehicle (BEV) that does not include an internal combustion engine, for example. The vehicle 100 includes an OTA master 10, a plurality of ECUs (only an ECU 20 is illustrated), a start switch 50, a driving device 61, an Autonomous Driving System (ADS) 62, and a Human Machine Interface (HMI) 70. The OTA master 10, the ECUs, the driving device 61, the ADS 62, and the HMI 70 receive supply of power from a power source (e.g. an in-vehicle battery) (not illustrated). The "ECU" means an Electronic Control Unit. The "OTA" is an abbreviation for "Over The Air".

The start switch 50 is a switch for a user to start a vehicle system (a control system for the vehicle 100), and is installed in a vehicle cabin of the vehicle 100, for example. In general, the start switch is referred to as a "power switch" or an "ignition switch". The vehicle system is switched between on (activated) and off (deactivated) when the user operates the start switch 50. Performing an operation to turn on the start switch 50 starts the vehicle system (including the OTA master 10 and the ECU 20) in the deactivated state, and brings the vehicle system to the activated state (hereinafter also referred to as "IG on"). Meanwhile, performing an operation to turn off the start switch 50 when the vehicle system is activated brings the vehicle system to the deactivated state (hereinafter also referred to as "IG off").

The operation to turn on the start switch 50 is an operation to switch the state of the vehicle 100 from IG off to IG on. When the user performs an operation to turn on the start switch 50, a start request is input to each of the OTA master 10 and the ECUs. That is, each of the OTA master 10 and the ECUs receives the start request from the user. On the other hand, the operation to turn off the start switch 50 is an operation to switch the state of the vehicle 100 from IG on to IG off. When the user performs an operation to turn off the start switch 50, a shutdown request is input to each of the OTA master 10 and the ECUs. That is, each of the OTA master 10 and the ECUs receives the shutdown request from the user. However, the operation to turn off the start switch 50 is prohibited while the vehicle 100 is traveling.

The HMI 70 includes an input device and a display device. The HMI 70 may include a touch panel display that functions as an input device and a display device. The HMI 70 may include an information display or a tell-tale as a display device. The HMI 70 may include a steering switch as an input device. Alternatively, at least one of an In-Vehicle Infotainment (IVI) system, an instrument panel, and a head-up display may function as the HMI 70.

The OTA center 500 is a server that provides a vehicle software update service using the OTA technology. The OTA center 500 is configured to perform in-vehicle ECU software update remotely from the center by way of a communication section. The OTA master 10 manages in-vehicle information, receives a campaign, and manages a software update sequence. The OTA master 10 incorporates a computer, and functions as an in-vehicle diagnosis device. The OTA master 10 controls the ECUs that have the OTA function. In the vehicle 100, each of the OTA master 10 and the ECUs 20 has the OTA function. Although not illustrated in FIG. 1, the vehicle 100 includes an ECU that has the OTA function, besides the ECU 20. The vehicle 100 may further include an ECU (not illustrated) that does not have the OTA function. The OTA master 10 and the ECUs are connected to each other via a communication bus, and configured to be communicable with each other through a wire. The communication method is not specifically limited, and a Controller Area Network (CAN) or an Ethernet (registered trademark) may be used, for example. Each of the ECUs (such as the ECU 20) mounted on the vehicle 100 includes a built-in computer including at least one processor and at least one memory. Each of the ECUs may include a plurality of microcomputers in the form of a main microcomputer, a sub microcomputer, etc. The vehicle 100 may include any number of ECUs.

The vehicle 100 is an autonomous driving vehicle configured to be capable of autonomous driving. The vehicle 100 according to the embodiment is configured to be able to execute both manned travel and unmanned travel. While the vehicle 100 is configured to be able to support unmanned autonomous travel, the vehicle 100 also can be manually driven by a user (manned travel). In addition, the vehicle 100 can execute autonomous driving (e.g. automatic cruise control) during manned travel. The level of autonomous driving may be fully autonomous driving (level 5), or may be conditional autonomous driving (e.g. level 4).

The ECU 20 is configured to control the driving device 61. The driving device 61 includes an accelerator device, a brake device, and a steering device. The accelerator device includes a motor generator (hereinafter referred to as an "MG") that rotates driving wheels of the vehicle 100, a power control unit (PCU) that drives the MG, and a battery that supplies power for driving the MG to the PCU. The MG functions as a motor for travel of the vehicle 100. The brake device includes a braking device provided for each of the wheels of the vehicle 100, and an actuator that drives the braking device, for example. The steering device includes an electric power steering (EPS) and an actuator that drives the EPS, for example.

The ADS 62 includes a recognition sensor (e.g. at least one of a camera, a millimeter wave radar, and a lidar) that recognizes the external environment of the vehicle 100, and executes a process related to autonomous driving based on information sequentially acquired by the recognition sensor. Specifically, the ADS 62 generates a travel plan (information that indicates the future behavior of the vehicle 100) that matches the external environment of the vehicle 100 in cooperation with the ECU 20. Then, the ADS 62 requests the ECU 20 to control various actuators included in the driving device 61 so as to drive the vehicle 100 in accordance with the travel plan.

In the embodiment, the ADS 62 is built in the vehicle 100, but is not limited to this. The ADS 62 may be an autonomous driving kit that can be removably mounted to the vehicle 100. A sensor unit (including the recognition sensor) of the autonomous driving kit may be attached to a rooftop of the vehicle 100.

The portable terminal 200 is configured to be carried by the user of the vehicle 100. In the embodiment, a smartphone provided with a touch panel display is adopted as the portable terminal 200. The smartphone includes a computer. However, the terminal 200 is not limited to this, and any terminal that can be carried by the user of the vehicle 100 can be adopted as the portable terminal 200. For example, a laptop computer, a tablet terminal, a portable gaming device, a wearable device (such as a smartwatch, smartglasses, and smartgloves), etc. can be adopted as the portable terminal 200.

Application software (hereinafter referred to as a "mobile app") that allows use of a service provided by the OTA center 500 is installed in the portable terminal 200. The mobile app is used to register identification information (terminal identifier (ID)) on the portable terminal 200 in the OTA center 500 in association with identification information (vehicle ID) on the vehicle 100. The portable terminal 200 can exchange information with the OTA center 500 through the mobile app. The portable terminal 200 may function as an electronic key that remotely locks and unlocks doors of the vehicle 100. In addition, the portable terminal 200 may play the same role as the start switch 50. The portable terminal 200 may remotely switch the state (IG on/IG off) of the vehicle system in accordance with an operation (on operation/off operation) from the user. The thus configured portable terminal 200 allows the user to switch the state of the vehicle system even when the user is outside the vehicle.

The OTA master 10, the portable terminal 200, and the OTA center 500 include processors 110, 210, and 510, memories 120, 220, and 520, and communication modules 130, 230, and 530, respectively. Each of the processors 110, 210, and 510 includes a central processing unit (CPU), for example. Each of the memories 120, 220, and 520 includes a non-volatile memory such as a flash memory, for example.

The communication module 130 is configured to communicate with a device outside the vehicle. The communication module 130 may include a telematics control unit (TCU) and/or a data communication module (DCM) that performs wireless communication. The communication module 130 may further include a communication interface (I/F) that performs communication through a wire with a device outside the vehicle. The OTA master 10 may perform communication through a wire with a scan tool (a dedicated tool that performs software update through a wire) via a data link connector (DLC) (not illustrated).

Each of the communication modules 130 and 230 accesses a communication network NW through wireless communication. The communication module 530 is connected to the communication network NW through a wire, and communicates with each of a plurality of vehicles (including the vehicle 100) and a plurality of portable terminals (including the portable terminal 200) via the communication network NW. The communication network NW is a wide area network constructed by the Internet and a wireless base station, for example. The communication network NW may include a cellular telephone network. Each of the OTA master 10 and the portable terminal 200 communicates with the OTA center 500 through wireless communication. The OTA master 10, the portable terminal 200, and the OTA center 500 communicate with each other via the communication network NW.

Figure 2:
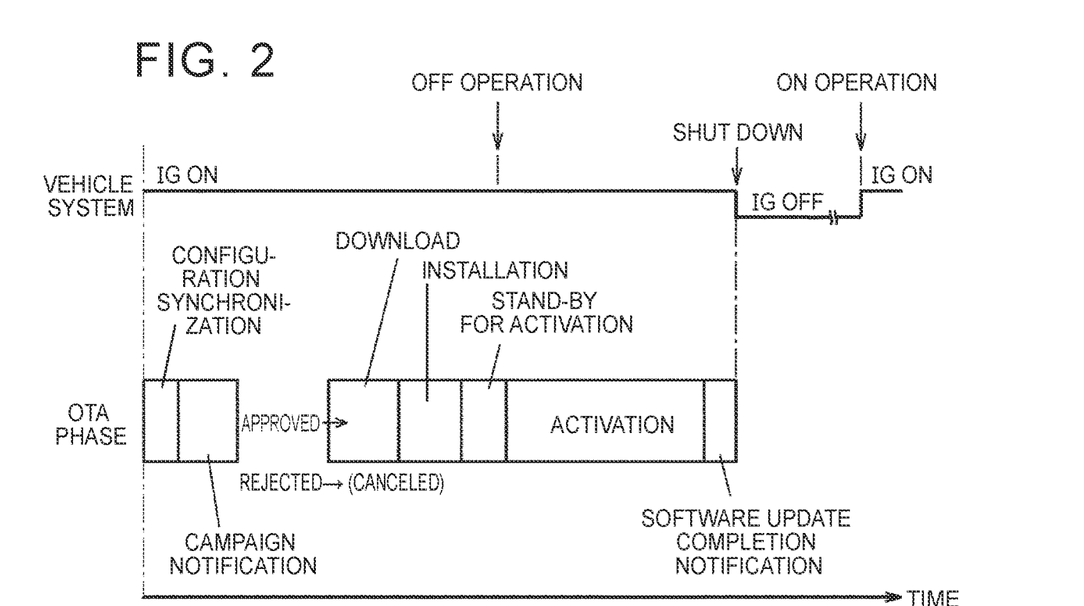
FIG. 2 illustrates an overview of a software update method according to the embodiment of the present disclosure.

FIG. 2 illustrates an overview of a software update method according to the embodiment. With reference to FIG. 1 in addition to FIG. 2, the process related to software update (more particularly, update of vehicle software that uses the OTA technology) is performed in a procedure such as configuration synchronization, campaign notification and application approval, download, installation, activation, and software update completion notification.

The vehicle 100 starts configuration synchronization when the IG of the vehicle system is turned on (e.g. when an operation is performed to turn on the start switch 50 or the portable terminal 200). The process of configuration synchronization by the vehicle 100 includes transmitting vehicle configuration information to the OTA center 500. The vehicle configuration information includes hardware information (information that indicates the item number of hardware, the identifier of the ECUs, etc.) and software information (information that indicates the item number of software etc.) for each of the ECUs included in the vehicle 100, for example. The vehicle configuration information may further include RXSWIN for each target for approval. The RXSWIN is an identification number that can specify software that constitutes the functional model approval.

When the vehicle configuration information is received from the vehicle 100, the OTA center 500 checks a campaign (software update) that is currently run. When there is any campaign that is applicable to the vehicle 100, the OTA center 500 transmits an approval request signal that requests a reply as to whether to approve download of new software (an updated version of software) related to the campaign to each of the OTA master 10 and the portable terminal 200 in response to receiving the vehicle configuration information. The approval request signal includes information (campaign information) about the campaign. The campaign information may include at least one of campaign attribute information (information that indicates the purpose of the software update, the function of the vehicle that may be affected by the update, etc.), a list of vehicles as targets for the campaign, information (e.g. software information before and after the update) about ECUs as targets for the campaign, and information about a notification to be sent to the user before and after the update, for example. The campaign for the notification may be a campaign that is newly run, or may be a campaign that was not applied previously. In the following, transmission of the approval request signal will occasionally be referred to as "campaign notification".

Figure 3:
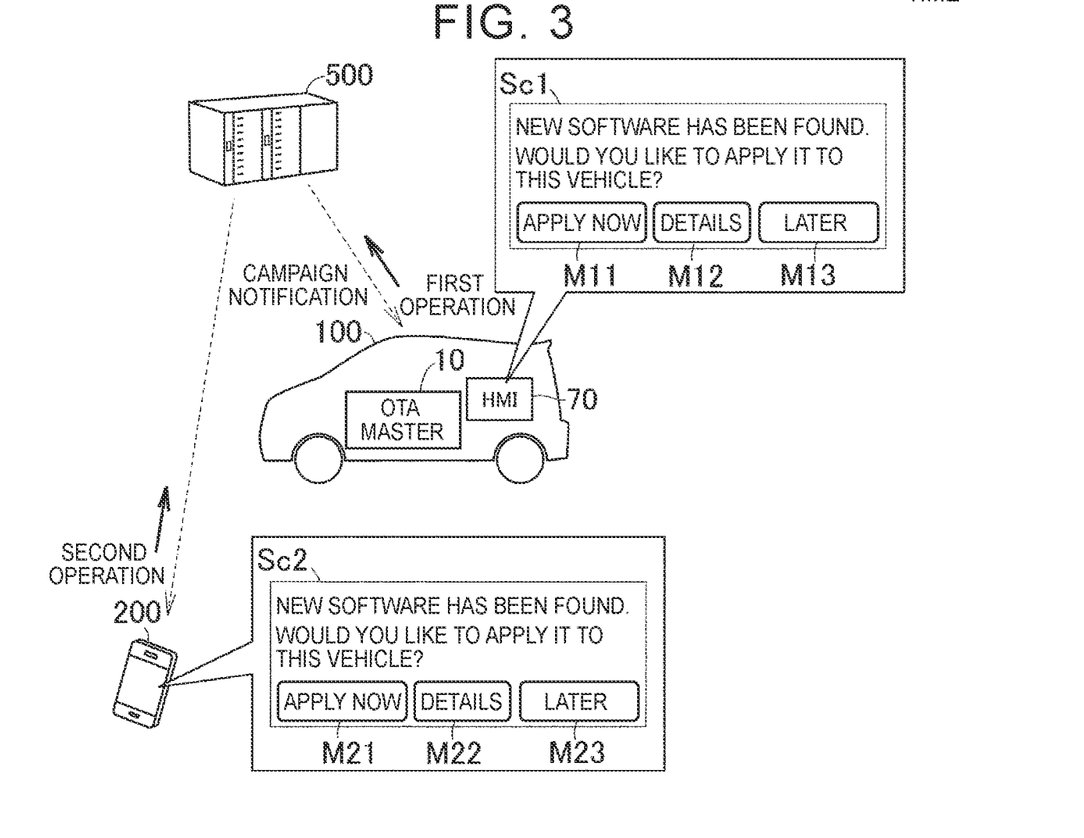
FIG. 3 illustrates an approval request in the software update method according to the embodiment of the present disclosure.

FIG. 3 illustrates campaign notification (approval request) in the software update method according to the embodiment. In the embodiment, the OTA master 10 and the HMI 70 mounted on the vehicle 100 cooperate with each other to function as an example of a "first terminal" according to the present disclosure.

With reference to FIG. 3, the OTA center 500 sends a campaign notification to each of the OTA master 10 and the portable terminal 200. When the campaign notification is received, each of the OTA master 10 and the portable terminal 200 prompts the user to perform an operation that indicates whether to approve or reject the campaign notification (approval request signal). When the above operation is performed by the user, each of the OTA master 10 and the portable terminal 200 sends a reply that matches the operation to the OTA center 500.

Specifically, when the OTA master 10 receives the campaign notification, the HMI 70 displays a screen Sc1. When the portable terminal 200 receives the campaign notification, the portable terminal 200 (touch panel display) displays a screen Sc2. Each of the screens Sc1, Sc2 displays a message such as "New software has been found. Would you like to apply it to this vehicle?", for example, and requests the user to perform an operation that indicates whether to approve download of the new software.

The screens Sc1, Sc2 include Apply buttons M11, M21 that receive an operation to "approve", confirm buttons M12, M22, and Non-apply buttons M13, M23 that receive an operation to "reject", respectively. When the Apply button M11 is operated, the OTA master 10 sends a reply of "approval" to the OTA center 500. When the Non-apply button M13 is operated, the OTA master 10 sends a reply of "rejection" to the OTA center 500. Hereinafter, an operation of either of the Apply button M11 and the Non-apply button M13 on the screen Sc1 will be referred to as a "first operation". When the Apply button M21 is operated on the screen Sc2, on the other hand, the portable terminal 200 sends a reply of "approval" to the OTA center 500. When the Non-apply button M23 is operated, the portable terminal 200 sends a reply of "rejection" to the OTA center 500. Hereinafter, an operation of either of the Apply button M21 and the Non-apply button M23 on the screen Sc2 will be referred to as a "second operation". Each of the first operation and the second operation indicates the intention (of either approval or rejection) of the user for the campaign notification (approval request).

When the confirm button M12 or M22 is performed before the first operation or the second operation discussed above is performed, the HMI 70 or the portable terminal 200 displays the content (at least a part of the campaign information) of the campaign. This allows the user to determine whether to approve download of the new software related to the campaign after grasping the content of the campaign.

Although discussed in detail later, the OTA center 500 according to embodiment determines a period (hereinafter referred to as a "reception period") for which a reply to an approval request signal is received after the approval request signal is transmitted to each of the OTA master 10 and the portable terminal 200 (see FIG. 4). When a reply is received from only one of the OTA master 10 and the portable terminal 200 within the reception period, the OTA center 500 validates the reply. When a reply is received from both the OTA master 10 and the portable terminal 200 within the reception period, meanwhile, the OTA center 500 invalidates the reply from the portable terminal 200 (a reply based on the second operation), and validates the reply from the OTA master 10 (a reply based on the first operation). When the OTA center 500 receives a reply (valid reply) that indicates "approval" within the reception period, the process related to the software update transitions to a download phase. When the OTA center 500 does not receive a reply (valid reply) that indicates "approval" within the reception period, on the other hand, the process related to the software update is ended without proceeding to a download phase.

With reference to FIG. 1 in addition to FIG. 2 again, the OTA center 500 and the vehicle 100 execute a process related to download in the procedure described below, for example. In the following, the terminal (the in-vehicle terminal or the portable terminal 200) that has made a valid reply that indicates "approval" discussed earlier will be referred to as an "approving terminal".

The OTA master 10 requests the OTA center 500 for a distribution package including the new software. Then, the OTA master 10 executes download of (receives and saves) the distribution package while performing wireless communication with the OTA center 500. The distribution package may include, in addition to the new software (e.g. a set of update data for each of the ECUs as targets for the campaign), package attribute information (information that indicates the update section, the number of update data in the distribution package, the order of installation for the ECUs, etc.) and update data attribute information (such as the identifier of the target ECU and verification data for verifying the correctness of the update data). The target ECU is an ECU as the target for the software update. The target ECU may be the ECU 20, and the software to be updated may be an autonomous driving control program, for example.

The distribution package is saved in a storage device (e.g. the memory 120) of the OTA master 10 through the process related to the download discussed above. During the download, the approving terminal informs the user of the progress of the download. After the completion of the download, the OTA master 10 verifies the authenticity of the downloaded distribution package. When the verification result is "normal", the OTA master 10 notifies the OTA center 500 of the software update state (the completion of the download). When this notification is made, it is meant that the download has been successful.

When the download is successfully performed, the vehicle 100 executes installation. Specifically, the OTA master 10 requests at least one target ECU (e.g. the ECU 20) to output the state of the target ECU and a diagnostic trouble code (DTC). The OTA master 10 determines whether installation is executable for each target ECU based on the state of the target ECU and the DTC. Then, the OTA master 10 transfers the new software (update data) to the target ECU for which installation is executable. When the update data are received, the target ECU executes installation of the update data (writing into the non-volatile memory). During the installation, the approving terminal informs the user of the progress of the installation.

When transfer of the update data from the OTA master 10 to the target ECU is completed, the target ECU transmits a transfer completion notification to the OTA master 10. When the transfer completion notification is received, the OTA master 10 requests the target ECU for integrity verification. When this request is received, the target ECU performs verification using integrity verification data (verification data), and transmits the verification result to the OTA master 10. The OTA master 10 saves the verification result (completion/failure/cancellation of installation) for each target ECU. When the integrity verification is completed for all the target ECUs and the verification result for all the target ECUs is "normal", the OTA master 10 notifies the OTA center 500 of the software update state (completion of installation). When this notification is made, it is meant that the installation has been successful.

When the installation is successfully performed in succession to the download, the vehicle 100 stands by for activation. After that, when an operation to turn off the start switch 50 or the portable terminal 200 is performed, the OTA master 10 causes the approving terminal to display a predetermined message to request the user to make an input that indicates one of "approval" and "rejection". When the user makes an input that indicates "approval" to the approving terminal, the OTA master 10 executes activation (activation of the installed software). When the user makes an input that indicates "rejection" to the approving terminal, on the other hand, the OTA master 10 cancels the process related to the software update without executing activation, and the vehicle system is shut down.

When the configuration after the completion of activation is successfully confirmed, the OTA master 10 causes the approving terminal to display the result of the software update. The approving terminal displays a software update completion screen that indicates success in the update, for example. After that, the OTA master 10 notifies the OTA center 500 of the software update state (completion of the software update). When this notification is made, it is meant that the OTA software update has been successful. When this notification is made, the control system for the vehicle 100 is shut down, and the IG is turned off. After that, when an operation to turn on the start switch 50 or the portable terminal 200 is performed, the IG of the vehicle system is turned on. Consequently, an updated program (a new version of software) is started in the target ECU.

Figure 4:
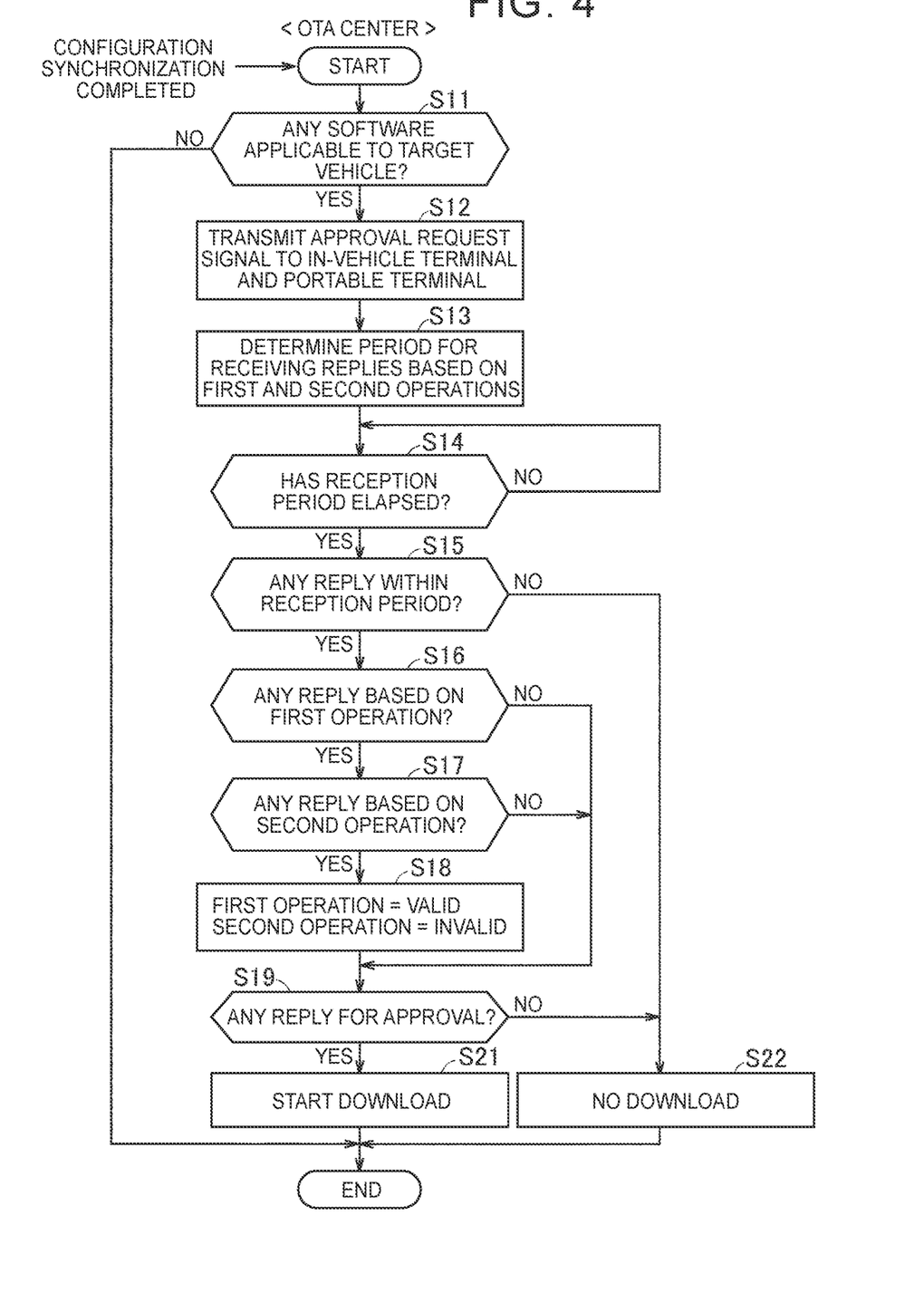
FIG. 4 is a flowchart illustrating the process procedure of the software update method according to the embodiment of the present disclosure.

FIG. 4 is a flowchart illustrating the process procedure of the software update method according to the embodiment. The process illustrated in the flowchart is executed by the OTA center 500 when the process of configuration synchronization is completed by a target vehicle. The target vehicle is the vehicle 100 illustrated in FIG. 1, for example. When the process of configuration synchronization is completed by the target vehicle, the OTA center 500 receives the vehicle configuration information discussed earlier from the target vehicle, and starts a series of processes illustrated in FIG. 4 to be described below for the target vehicle. In the embodiment, the OTA center 500 corresponds to an example of a "server" according to the present disclosure. In the embodiment, the processor 510 illustrated in FIG. 1 functions as an example of a "requesting unit" and a "reception unit" according to the present disclosure. The following flowchart is implemented by one or more processors reading and executing a program stored in one or more memories. Symbol "S" in the flowchart means a step.

With reference to FIG. 4 in addition to FIGS. 1 to 3, the OTA center 500 determines whether there is any campaign (new or unapplied software update) that is applicable to the target vehicle in S11. When there is no campaign that is applicable to the target vehicle (NO in S11), the series of processes illustrated in FIG. 4 is ended. When there is any campaign that is applicable to the target vehicle (YES in S11), the OTA center 500 transmits the approval request signal discussed earlier to each of the OTA master 10 and the portable terminal 200 in the subsequent S12. Subsequently, the OTA center 500 determines the reception period discussed earlier (a period for which a reply to the approval request signal is received) in S13. The OTA center 500 determines the reception period based on the content of the campaign (content of the software update), for example. More particularly, when the approval request signal requests approval for an update process for software (e.g. software about safety) for which early update is recommended, the OTA center 500 renders the reception period longer than when the approval request signal requests approval for an update process for normal software (software with less urgency). Consequently, the user is more likely to give approval. Alternatively, the OTA center 500 may determine a reception period based on the status of the target vehicle. For example, when the user is driving to park the target vehicle, the OTA center 500 may extend the reception period to allow the user to make a reply after parking is completed. However, it is not limited to this, and the reception period may be a fixed period determined in advance.

In the subsequent S14, the OTA center 500 determines whether the reception period determined in S13 has elapsed. While the reception period has not elapsed (NO in S14), the OTA center 500 receives a reply from each of the OTA master 10 and the portable terminal 200. When the reception period has elapsed (YES in S14), the OTA center 500 determines whether a reply to the approval request signal has been received within the reception period (S15). When the reception period has elapsed without the OTA center 500 receiving any reply from either of the OTA master 10 and the portable terminal 200 (NO in S15), the OTA center 500 notifies each of the OTA master 10 and the portable terminal 200 that the software is not downloaded in S22, and ends the series of processes illustrated in FIG. 4. In this case, the OTA center 500 does not download new software related to the campaign.

When the OTA center 500 has received a reply from at least one of the OTA master 10 and the portable terminal 200 within the reception period (YES in S15), the OTA center 500 determines whether a reply (a reply based on the first operation) has been received from the OTA master 10 within the reception period in S16. When the OTA center 500 has not received a reply from the OTA master 10 within the reception period, NO is determined in S16, and the process proceeds to S19. When NO is determined in S16, it is meant that the OTA center 500 has received a reply from only the portable terminal 200. In this case, the reply from the portable terminal 200 is validated.

When YES is determined in S16, on the other hand, the OTA center 500 determines whether a reply (a reply based on the second operation) has been received from the portable terminal 200 within the reception period in S17. When the OTA center 500 has not received a reply from the portable terminal 200 within the reception period, NO is determined in S17, and the process proceeds to S19. When NO is determined in S17, it is meant that the OTA center 500 has received a reply from only the OTA master 10. In this case, the reply from the OTA master 10 is validated.

When YES is determined in both S16 and S17, further, the OTA center 500 invalidates the reply from the portable terminal 200 and validates the reply from the OTA master 10 in S18. After that, the process proceeds to S19. When YES is determined in both S16 and S17, it is meant that the OTA center 500 has received a reply from both the OTA master 10 and the portable terminal 200.

In S19, the OTA center 500 determines whether to download new software related to the campaign based on the valid reply. When the valid reply indicates "rejection" (NO in S19), the process proceeds to S22 discussed earlier. In this case, download is not executed. When the valid reply indicates "approval" (YES in S19), on the other hand, the OTA center 500 advances the process related to the software update to a download phase in S21. Consequently, download of new software related to the campaign is started. When the process in S21 is executed, the series of processes illustrated in FIG. 4 is ended. The process after the start of download has been discussed already (see FIG. 2).

As has been described above, the software update method according to the embodiment includes the process illustrated in FIG. 4. That is, the OTA center 500 (server) requests the OTA master 10 (first terminal) mounted on the vehicle 100 and the portable terminal 200 (second terminal) that can be carried by the user of the vehicle 100 for a reply as to whether to approve a process (e.g. download) related to update of software for an ECU (control device) mounted on the vehicle 100 (S12). When a reply has been received from both the OTA master 10 and the portable terminal 200 in response to the request (YES in both S16 and S17), the OTA center 500 invalidates the reply from the portable terminal 200 and validates the reply from the OTA master 10 (S18).

With the above method, the user can select which of the in-vehicle terminal (HMI 70) of the vehicle 100 and the portable terminal 200 to use for the reply. Consequently, sufficient convenience can be easily secured for the user. When the reply to the request is received from both the in-vehicle terminal (OTA master 10) of the vehicle 100 and the portable terminal 200, the OTA center 500 invalidates the reply from the portable terminal 200 and validates the reply from the in-vehicle terminal. When both the in-vehicle terminal and the portable terminal 200 have made a reply, it is highly likely that the reply from the portable terminal 200 is based on an erroneous operation. Thus, it is possible to suppress execution of a process related to software update not desired by the user due to an erroneous operation, by invalidating the reply from the portable terminal 200 and validating the reply from the in-vehicle terminal.

Figure 5:
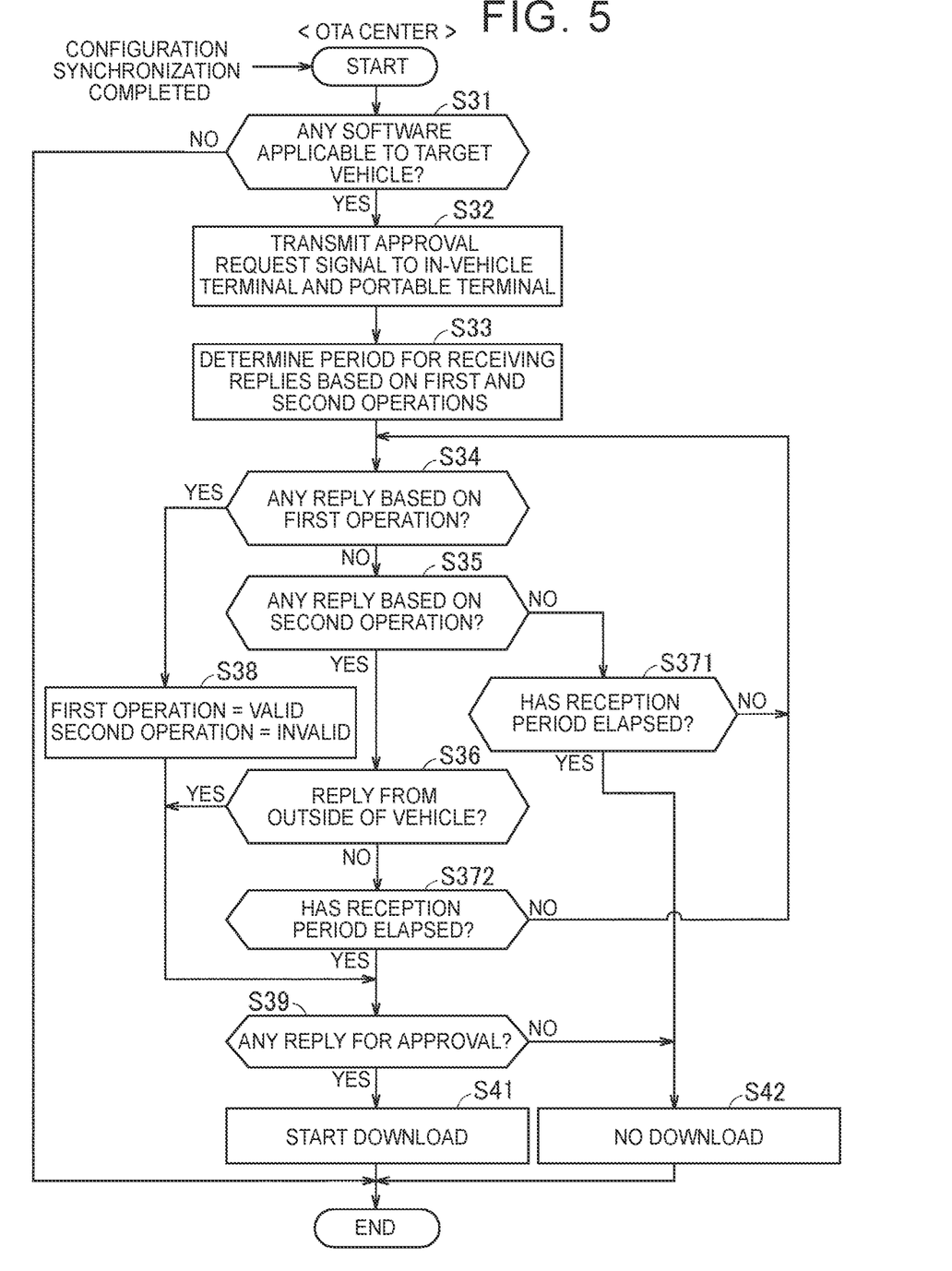
FIG. 5 illustrates a modification of the process illustrated in FIG. 4.

The process illustrated in FIG. 4 is changeable as appropriate. For example, the OTA center 500 may execute a process illustrated in FIG. 5 in place of the process illustrated in FIG. 4. FIG. 5 illustrates a modification of the process illustrated in FIG. 4.

With reference to FIG. 5 in addition to FIGS. 1 to 3, in S31 to S33, the OTA center 500 executes processes corresponding to S11 to S13, respectively, in FIG. 4. After that, the OTA center 500 determines whether a reply (a reply based on the first operation) has been received from the OTA master 10 within the reception period in S34, as in S16 in FIG. 4. When NO is determined in S34, the OTA center 500 determines whether a reply (a reply based on the second operation) has been received from the portable terminal 200 within the reception period in S35, as in S17 in FIG. 4. When NO is determined in S35, the OTA center 500 determines whether the reception period determined in S33 has elapsed in S371. When NO is determined in S371, the process returns to S34. S34, S35, and S371 are repeatedly performed while NO is determined in all of S34, S35, and S371.

When the reception period has elapsed without the OTA center 500 receiving a reply from either of the OTA master 10 and the portable terminal 200 (YES in S371), the OTA center 500 notifies each of the OTA master 10 and the portable terminal 200 that software is not downloaded in S42, and thereafter ends the series of processes illustrated in FIG. 5.

When the OTA center 500 has received a reply from the portable terminal 200 without receiving a reply from the OTA master 10 within the reception period (YES in S35), the OTA center 500 determines whether the portable terminal 200 is present outside the vehicle 100 in S36. The OTA center 500 may receive position information from each of the vehicle 100 and the portable terminal 200, and determine whether the portable terminal 200 is present outside the vehicle 100 based on the position information, for example. Alternatively, the OTA center 500 may receive a signal that indicates whether the portable terminal 200 is present in the vehicle 100 from the portable terminal 200, and determine whether the portable terminal 200 is present outside the vehicle 100 based on the signal. When the portable terminal 200 is present outside the vehicle 100 (YES in S36), the process proceeds to S39. In this case, the reply from the portable terminal 200 is validated.

When the portable terminal 200 is not present outside the vehicle 100 (NO in S36), the OTA center 500 determines whether the reception period determined in S33 has elapsed in S372. When NO is determined in S372, the process returns to S34. When YES is determined in S372, on the other hand, the process proceeds to S39. In this case, the reply from the portable terminal 200 is validated.

When the OTA center 500 has received a reply from the OTA master 10 within the reception period (YES in S34), the process proceeds to S38. In this case, the reply from the OTA master 10 is validated. When the OTA center 500 has also received a reply from the portable terminal 200 within the reception period, the reply from the portable terminal 200 is invalidated in S38. After that, the process proceeds to S39.

In S39, the OTA center 500 determines whether to download new software related to the campaign based on the valid reply, as in S19 in FIG. 4. When the valid reply indicates "rejection" (NO in S39), the process proceeds to S42 discussed earlier. In this case, download is not executed. When the valid reply indicates "approval" (YES in S39), on the other hand, the OTA center 500 advances the process related to the software update to a download phase in S41. Consequently, download of new software related to the campaign is started. When the process in S41 is executed, the series of processes illustrated in FIG. 5 is ended.

In the software update system according to the above modification, when the OTA center 500 has received a reply from the in-vehicle terminal (OTA master 10) of the vehicle 100 within the reception period (YES in S34), the OTA center 500 determines whether to download software based on the reply from the in-vehicle terminal without waiting for the lapse of the reception period (S39). Consequently, a time lag (response delay) since the reply from the in-vehicle terminal of the vehicle 100 until the start of download is reduced. When the OTA center 500 has received a reply from the portable terminal 200 within the reception period and the reception period has elapsed without the OTA center 500 receiving a reply from the in-vehicle terminal of the vehicle 100 (YES in S372), the OTA center 500 determines whether to download software based on the reply from the portable terminal 200 (S39). When the OTA center 500 has received a reply from the portable terminal 200 positioned outside the vehicle 100 within the reception period (YES in S36), the OTA center 500 determines whether to download software based on the reply from the portable terminal 200 without waiting for the lapse of the reception period (S39). Consequently, a time lag (response delay) since the reply from the portable terminal 200 until the start of download is reduced. When the portable terminal 200 that made the reply is present outside the vehicle, it is highly likely that the user is located outside the vehicle, and it is less likely that a terminal (e.g. the HMI 70) mounted on the vehicle 100 is to be operated.

In the above embodiment, an on-premise server is adopted as the OTA center 500 (see FIG. 1). However, the embodiment is not limited to this, and the function (e.g. a function related to software update) of the OTA center 500 may be implemented on the cloud through cloud computing. That is, the OTA center 500 may be a cloud server. The software to be updated is not limited to a control program for a driving assist system such as the autonomous driving control program discussed earlier, and may be any software. It is not necessary that the vehicle should be configured to be capable of autonomous driving.

The vehicle may be an xEV (electrified vehicle) other than a BEV. The vehicle may be a plug-in hybrid electric vehicle (PHEV) or a hybrid electric vehicle (HEV) that includes an internal combustion engine (e.g. a gasoline engine, a biofuel engine, or a hydrogen engine). The vehicle is not limited to a four-wheeled passenger vehicle, and may be a bus or a truck, or may be a three-wheeled xEV. The in-vehicle battery may be configured to be chargeable in a contact manner, may be configured to be chargeable in a non-contact manner (wirelessly) while the vehicle is parked or traveling, or may be configured with a replaceable battery. The vehicle may include a solar panel. The vehicle may have a flight function. The vehicle may be a Mobility as a Service (MaaS) vehicle. The MaaS vehicle is a vehicle managed by a MaaS provider. The vehicle may be a multi-purpose vehicle to be customized in accordance with the purpose of use of the user. The vehicle may be a mobile-shop vehicle, a robot taxi, an automated guided vehicle (AGV), or an agricultural machine. The vehicle may be a small unmanned or single-seater BEV (e.g. a last-mile BEV or an electric wheelchair).

The above various modifications may be implemented in any combination. The embodiment disclosed herein should be construed as illustrative in all respects and not limiting. The scope of the present disclosure is indicated by the claims rather than by the description of the above embodiment, and intended to include all changes that fall within the meaning and scope equivalent to the claims.

A first aspect of the present disclosure provides a server including a requesting unit and a reception unit. The requesting unit is configured to make a request of a first terminal and a second terminal for a reply as to whether to approve a process related to update of software for a control device mounted on a vehicle. The first terminal is a terminal mounted on the vehicle, and the second terminal is a terminal to be carried by a user of the vehicle. The reception unit is configured to, when receiving both the reply from the first terminal and the reply from the second terminal as a response to the request, invalidate the reply from the second terminal and validate the reply from the first terminal.

The server makes a request of an in-vehicle terminal (first terminal) and a portable terminal (second terminal) for a reply as to whether to approve a process related to update of software for a control device mounted on the vehicle. This allows the user to select which of the in-vehicle terminal and the portable terminal to use in order to make the reply. Consequently, sufficient convenience can be easily secured for the user. When the reply to the request is received from both the in-vehicle terminal and the portable terminal, the server invalidates the reply from the portable terminal and validates the reply from the in-vehicle terminal. It is highly like that the reply from the portable terminal is based on an erroneous operation when a reply is made by both the in-vehicle terminal and the portable terminal. Thus, it is possible to suppress execution of a process related to software update not desired by the user due to an erroneous operation, by invalidating the reply from the portable terminal and validating the reply from the in-vehicle terminal.

In the above aspect, the reception unit may be configured to determine a reception period during which the reply to the request is received. The reception unit may be configured to determine whether to download the software based on the reply from the first terminal when the reception unit has received both the reply from the first terminal and the reply from the second terminal within the reception period.

With the above configuration, it is possible to suppress execution of download not desired by the user due to an erroneous operation while securing sufficient convenience for the user in software update. For example, the user can invalidate a reply based on an erroneous operation by making a correct reply using the in-vehicle terminal within the reception period when the user has erroneously operated the portable terminal.

In the above aspect, the reception unit may be configured to determine whether to download the software based on the reply from the first terminal without waiting for lapse of the reception period when the reception unit has received the reply from the first terminal within the reception period. The reception unit may be configured to determine whether to download the software based on the reply from the second terminal when the reception unit has received the reply from the second terminal within the reception period and the reception period has elapsed without the reception unit receiving the reply from the first terminal.

With the above configuration, a time lag (response delay) since the reply from the first terminal until the start of download is reduced. In addition, the server can determine whether to download the software based on the reply from the second terminal when the reply from the first terminal has not been received and the reply from the second terminal has been received. Consequently, the convenience for the user is improved.

In the above aspect, the reception unit may be configured to determine whether to download the software based on the reply from the second terminal without waiting for lapse of the reception period when the reception unit has received the reply from the second terminal positioned outside the vehicle within the reception period.

With the above configuration, a time lag (response delay) since the reply from the second terminal until the start of download is reduced. When the second terminal which has made the reply is present outside the vehicle, it is highly likely that the user is outside the vehicle, and it is less likely that the terminal mounted on the vehicle is to be operated.

In the above aspect the reception unit may be configured to determine the reception period based on a content of the update of the software. The reception unit may be configured not to download the software when the reception period has elapsed without any reply received from either of the first terminal and the second terminal.

With the above configuration, the software is not downloaded when the reception period has elapsed before no reply is made. Consequently, it is not necessary for the user to make a reply for rejection. In addition, the server can set the reception period to an appropriate length by determining the reception period in accordance with the content of the update of the software. The server may extend the reception period to allow the user to approve easily in update of software for which early update is recommended, for example.

A second aspect of the present disclosure provides a software update system including: a vehicle; a first terminal mounted on the vehicle; a second terminal to be carried by a user of the vehicle; and a server. The server is configured to make a request of the first terminal and the second terminal for a reply as to whether to approve a process related to update of software for a control device mounted on the vehicle. Each of the first terminal and the second terminal is configured to prompt the user to perform an operation that indicates whether to approve or reject the request. Each of the first terminal and the second terminal is configured to send a reply that matches the operation to the server when the operation is performed by the user. The server is configured to when receiving both the reply from the first terminal and the reply from the second terminal, invalidate the reply from the second terminal and validate the reply from the first terminal.

Also with the above software update system, it is possible to suppress execution of a process related to software update not desired by a user due to an erroneous operation while securing sufficient convenience for the user in software update, as with the server discussed earlier.

A third aspect of the present disclosure provides a software update method executed by a computer. The software update method includes: making a request of a first terminal and a second terminal for a reply as to whether to approve a process related to update of software for a control device mounted on a vehicle; and invalidating the reply from the second terminal and validating the reply from the first terminal when receiving both the reply from the first terminal and the reply from the second terminal as a response to the request. The first terminal is a terminal mounted on the vehicle, and the second terminal is a terminal to be carried by a user of the vehicle.

Also with the above software update method, it is possible to suppress execution of a process related to software update not desired by a user due to an erroneous operation while securing sufficient convenience for the user in software update, as with the server discussed earlier.

A fourth aspect of the present disclosure provides a non-transitory storage medium storing instructions that are executable by a computer and that cause the computer to execute the software update method. A certain embodiment provides a computer device including a storage device that stores the above program and a processor that executes the program stored in the storage device. Another embodiment provides a computer device that distributes the above program.

What is claimed is:

1. A server comprising one or more processors configured to:
   make a request of a first terminal and a second terminal for a reply as to whether to approve a process related to update of software for a control device mounted on a vehicle, the first terminal being a terminal mounted on the vehicle, and the second terminal being a terminal to be carried by a user of the vehicle;
   determine a reception period during which replies to the request are to be received;
   receive a reply from the first terminal and a reply from the second terminal within the reception period;
   when receiving both the reply from the first terminal and the reply from the second terminal as a response to the request, invalidate the reply from the second terminal and validate the reply from the first terminal;
   download content of the update of the software related to the control device when the validated reply indicates approval of the process related to the update of the software; and
   execute installation of the content of the update of the software on the control device after downloading the content of the update.

2. The server according to claim 1, wherein the one or more processors are configured to:
   determine whether to download the software based on the reply from the first terminal when the one or more processors have received both the reply from the first terminal and the reply from the second terminal within the reception period.

3. The server according to claim 2, wherein the one or more processors are configured to:
   determine whether to download the software based on the reply from the first terminal without waiting for lapse of the reception period when the one or more processors have received the reply from the first terminal within the reception period; and
   determine whether to download the software based on the reply from the second terminal when the one or more processors have received the reply from the second terminal within the reception period and the reception period has elapsed without the one or more processors receiving the reply from the first terminal.

4. The server according to claim 3, wherein the one or more processors are configured to determine whether to download the software based on the reply from the second terminal without waiting for lapse of the reception period when the one or more processors have received the reply from the second terminal positioned outside the vehicle within the reception period.

5. The server according to claim 2, wherein the one or more processors are configured to:
   determine the reception period based on a content of the update of the software; and
   not to download the software when the reception period has elapsed without any reply received from either of the first terminal and the second terminal.

6. A software update system comprising:
   a vehicle;
   a first terminal mounted on the vehicle;
   a second terminal to be carried by a user of the vehicle; and
   a server,
   the server being configured to;
      make a request of the first terminal and the second terminal for a reply as to whether to approve a process related to update of software for a control device mounted on the vehicle;
      determine a reception period during which replies to the request are to be received;
      receive a reply from the first terminal and a reply from the second terminal within the reception period;
      when receiving both the reply from the first terminal and the reply from the second terminal within the reception period, invalidate the reply from the second terminal and validate the reply from the first terminal;
      download content of the update of the software related to the control device when the validated reply indicates approval of the process related to the update of the software; and
      execute installation of the content of the update of the software on the control device after downloading the content of the update,
   each of the first terminal and the second terminal being configured to prompt the user to perform an operation that indicates whether to approve or reject the request, and
   each of the first terminal and the second terminal being configured to send a reply that matches the operation to the server when the operation is performed by the user.

7. A software update method executed by a computer, the software update method comprising:
   making a request of a first terminal and a second terminal for a reply as to whether to approve a process related to update of software for a control device mounted on a vehicle, the first terminal being a terminal mounted on the vehicle, and the second terminal being a terminal to be carried by a user of the vehicle;
   determining a reception period during which replies to the request are to be received;
   receiving a reply from the first terminal and a reply from the second terminal within the reception period;
   invalidating the reply from the second terminal and validating the reply from the first terminal when receiving both the reply from the first terminal and the reply from the second terminal as a response to the request;
   downloading content of the update of the software related to the control device when the validated reply indicates approval of the process related to the update of the software; and
   executing installation of the content of the update of the software on the control device after downloading the content of the update.

8. A non-transitory storage medium storing instructions that are executable by a computer and that cause the computer to execute the software update method according to claim 7.

* * * * *